United States Patent [19]

Hibbs, Jr. et al.

[11] 3,859,605

[45] Jan. 7, 1975

[54] AMPLIFYING MEANS AND SYSTEM

[75] Inventors: Eugene B. Hibbs, Jr., La Canada; Roger Swire, IV, Lakeview Terrace, both of Calif.

[73] Assignee: Digilin Incorporated, Glendale, Calif.

[22] Filed: Mar. 26, 1973

[21] Appl. No.: 345,062

[52] U.S. Cl. .................... 330/30 R, 330/24, 330/17

[51] Int. Cl. .................... H03f 3/68

[58] Field of Search .................... 330/30 D, 23, 26

[56] References Cited

UNITED STATES PATENTS

| | | | |
|---|---|---|---|
| 3,452,289 | 6/1969 | Ryan | 330/23 |
| 3,500,221 | 3/1970 | Mercier | 330/23 X |
| 3,678,405 | 7/1972 | Avins | 330/26 |
| 3,757,137 | 9/1973 | Ahmed | 330/30 D X |

*Primary Examiner*—Nathan Kaufman

*Attorney, Agent, or Firm*—Lyon and Lyon

[57] ABSTRACT

An amplifier having a pair of input terminals is provided with a positive current feedback circuit which extends from the output of the amplifier through a resistance and a current sink, such resistance thereby having a voltage developed thereacross in accordance with the output of the amplifier. The resistance is connected in a unique manner with respect to the amplifier input terminals and terminals of a signal source so that all of the current flowing through said resistance flows into said current sink and substantially none flows to such signal source terminals nor to the signal source. A modification involving the use of two additional current sinks operating in conjunction with an additional current source assures operation of the amplifier over a range of either applied positive going or negative going voltages. Further modification assure operation over large ranges of applied voltages.

11 Claims, 3 Drawing Figures

PATENTED JAN 7 1975

3,859,605

AMPLIFYING MEANS AND SYSTEM

An object of the present invention is to provide an improved amplifying system which rejects common mode noise.

An object of the present invention is to provide an improved amplifying system which produces voltage indications with respect to a ground plane without being affected by conditions such as for example currents flowing in ground loops.

An object of the present invention is to provide an improved amplifying system particularly useful as a null detecting device in a bridge network where one terminal of the voltage source supplying current to the bridge is at ground potential.

An object of the present invention is to provide an improved amplifying system which is particularly useful in measuring very small ohmic resistances as may for example be present in a weld under test wherein a current is passed through such weld from a grounded voltage source and the voltage drop across such weld is indicative of ohmic resistance of the weld.

An object of the present invention is to provide an improved amplifying system wherein the effect of lead resistance or current flow in the leads connected between the input terminals of the system and the input source whose voltage is to be accurately measured or indicated is rendered of no consequence.

An object of the present invention is to provide an improved instrumentation amplifier with high common mode rejection without for example requiring two precision input amplifiers to achieve such desired high common mode rejection.

An object of the present invention is to provide an improved instrumentation amplifier which is simple and relatively inexpensive.

An object of the present invention is to provide an improved instrumentation amplifier which is particularly useful in accurately measuring one microvolt levels.

An object of the present invention is to provide an improved instrumentation amplifier which involves the use of only one low level amplifier and which thus obviates those noise problems inherent in a two-amplifier system.

Another object of the present invention is to provide an improved differential microvolt input amplifier intended for precise, low-level, signal measurement where low noise, low drift, high common mode rejection, and high accuracy are required.

Another object of the present invention is to provide an instrument of this character which is particularly useful in strain gauge applications, milliohn measurement, thermocouple display and other microvolt instruments.

The features of the present invention which are believed to be novel are set forth with particularity in the appended claim. This invention itself, both as to its organization and manner of operation, together with further objects and advantages thereof, may be best understood by reference to the following description taken in connection with the accompanying drawings in which:

Figures 1, 2, 3:
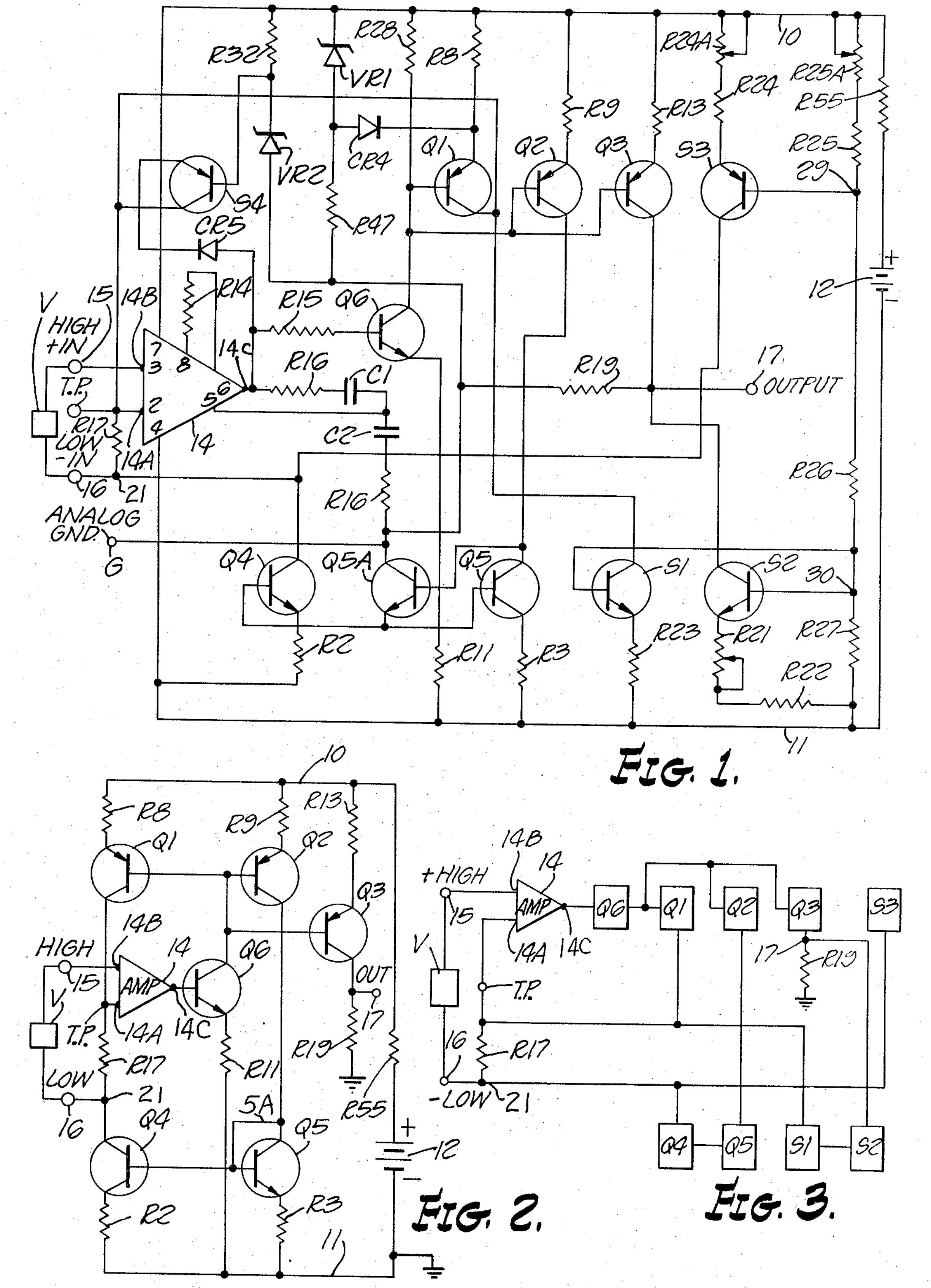
FIG. 1 illustrates in schematic form a system embodying features of the present invention for accommodating both positive and negative input voltages.
FIG. 2 illustrates a simplified form of apparatus embodying the present invention.
FIG. 3 illustrates a simplified form of the invention in FIG. 1.

Referring to a simplified form of the invention illustrated in FIG. 2, the matched transistors Q1, Q2 and Q3 of the PNP type each has its emitter electrode connected to the positive lead 10 through a corresponding resistor R8, R9, R13 each of 10,000 ohms; with the base electrode of each being connected to the collector electrode of transistor Q6. The collector electrode of transistor Q1 is connected through resistor R17 of 10 ohms to the collector electrode of transistor Q4 of the NPN type which has characteristics matching those of transistor Q5. The collector electrode of transistor Q5 is connected to the collector electrode of transistor Q2. Transistors Q4 and Q5 have their emitter electrodes connected to the negative lead 11 through corresponding resistors R2 and R3 each of, for example, 10,000 ohms. In FIG. 2 the base and collector electrodes of transistor Q5 are interconnected and connected to the base electrode of transistor Q4. The leads 10 and 11 are connected respectively to the positive and negative terminals of a D.C. source 12 which may have a 100 ohm resistance R55 connected in series therewith.

The junction point of resistor R17 and the collector of transistor Q1 is connected to the (test point) terminal T.P. which is connected to one of the input terminals 14A of operational amplifier 14 having its other input terminal 14B connected to the terminal 15 designated as "High." The terminal 16 designated "Low" is connected to the junction point 21 of resistor R17 and the collector electrode of transistor Q4.

Output terminal 14C of amplifier 14 is connected to the base electrode of transistor Q6 of the NPN type which has its emitter electrode connected through resistor R11 of 10,000 ohms to the negative lead 11.

The collector electrode of transistor Q6 as mentioned previously is connected to the base electrode of each of transistors Q1, Q2 and Q3. The collector electrode of transistor Q3 is connected through resistor R19 of 10,000 ohms to a reference voltage plane such as ground or zero volts. An output signal appears at the output terminal 17 which corresponds to the collector electrode of transistor Q3.

Analyzing this circuit shown in FIG. 2, it will be seen that the micro circuit operational amplifier 14 converted in the non-inverting mode, provides a positive current feedback via transistors Q6 and Q1, i.e., as more positive voltage is applied between terminals 15 and 16 more current passes through transistor Q1 and the 10 ohm resistor R17. Because transistors Q1, Q2 and Q3 are matched, the collector current of each of these three transistors is substantially identical. Because these collector currents are the same and because the collector resistor of transistor Q3 is 10,000 ohms, there is, in effect, a voltage amplification because identical currents passing through the 10 ohm feedback resistor R17 and the 10,000 ohm output resistor R19 produce voltage in the ratio of 1,000 to 1.

Of significant importance is the fact that transistors Q4 and Q5 are matched transistors, i.e., the collector currents of these transistors are the same and also the same as the collector currents of transistors Q1 and Q2. Because the collector currents of transistors Q1 and Q4 are the same, there is no current flow between the amplifier terminal 14A and the terminal T.P. In other words, the collector current of transistor Q1 may be said to be completely absorbed by transistor Q4 so that there is substantially no bias current out of the high and low input terminals 15, 16. Thus a true differential input amplifier results with a very high input resistance on both input leads 15, 16 and exceptionally high common mode rejection.

The circuit shown in FIG. 2 is for accommodation of positive input voltages and as now described is incorporated in the system shown in FIG. 1 to which both positive and negative input voltages may be applied and amplified. Corresponding parts in FIGS. 1 and 2 and also in FIG. 3 have identical reference numerals.

It will be seen that FIG. 2 is modified in the following respects to accommodate not only positive input signals but also negative input signals.

These modifications in FIG. 1 involve the addition of three transistors S1, S2 and S3 (as indicated also in FIG. 3) with transistors S1 and S2 serving essentially as current sinks in establishing desired normal voltage conditions at input terminal T.P. and output terminal 17 and the other transistor S3 operates in conjunction with transistor Q4 to establish a desired normal potential at terminal 16.

A transistor Q5A serves the general purposes of the wire connector 5A in FIG. 2 between the collector and base electrodes of transistor Q5. In FIG. 1 the collector and base of transistor Q5 are connected respectively to the base and emitter of transistor Q5A which has its collector electrode connected to that terminal of resistance R19 (which is illustrated as being grounded in FIG. 2) designated in FIG. 1 as an analog ground terminal G.

It will be seen that transistor Q1 in FIG. 1 has its base electrode connected to the positive lead 10 via resistance R28 and its collector electrode connected to the collector electrode of transistor S1 which has its emitter connected to negative lead 11 via resistance R23 and its base electrode connected to the base electrode of transistor S2 and also to a point 30 in a voltage dividing network comprising the resistances R25A, R25, R26 and R26 connected in series between leads 10 and 11. The collector of transistor S2 is connected to the output terminal 17 and the emitter of transistor S2 is connected to lead 11 via resistance R21.

Transistor S3 has its emitter connected to lead 10 via series connected resistances R24A, R24 and its base connected to a point 29 in the previously described voltage dividing network and its collector connected to the collector of transistor Q4 which corresponds to the "Low" input terminal 16.

In order to assure operation over a larger range, i.e to prevent early saturation of transistor Q1 with increasing positive voltages, the zener diode VR1, diode CR4 and resistor R47 are connected as follows. The positive terminals of these diodes VR1 and CR4 are interconnected with one terminal of resistor R47, the other terminal of diode VR1 being connected to lead 10, the other terminal of diode CR4 being connected to the emitter electrode of transistor Q2 and the other terminal of resistor R47 being connected to ground terminal G. Thus as the positive voltage on input terminal 15 increases the voltage on output terminal 17 increases causing transistor Q1 to be more conductive because its base is connected to the collector of transistor Q6. To prevent early saturation of transistor Q1 its emitter voltage is controlled. Thus as transistor Q1 tends to conduct more current the diode CR4 is forward biased to allow more current to flow through the feedback path.

For the same general purposes i.e. to assure continuous control there is provided transistor S4, resistor R32 and zener diode VR2. Resistor R32 and diode VR2 are connected in series between lead 10 and terminal G and the junction point of resistor R32 and diode VR2 is connected to the base of transistor S4 which has its collector electrode connected to the collector of transistor Q1 and its emitter electrode connected via diode CR5 and resisitor R15 to the base of transistor Q6.

It will be seen that the circuit of FIG. 1 accommodates also negative going input voltages provided by the source V. In such case the output resistor R19 is used to sink the current, it being noted that such terminal is connected to the collector of transistor S2 and Q3. In general, the output voltage may be expressed in terms of the product of the magnitude of resistance R19 and the difference in transistor currents S2 and Q3. In a zero condition transistor Q3 is sourcing the same current which is being sinked by transistor S2. As the input voltage increases, transistor Q6 conducts more current, transistor Q3 sources more current and the output voltage becomes more positive. On the other hand when a negative input voltage is applied transistor Q6 would conduct less current and transistor Q3 sources less current. However transistor S2 would still sink the same amount of current and thus the output voltage becomes increasingly negative with increasing negative input voltage.

It is also noted that in general the current flowing through resistance R17 may be expressed as equal to the current from transistor Q1 minus the current flowing into sink S1 plus the current supplied from source S3 minus the current flowing into sink Q4 and that the resistor current then may be expressed as $I_{R17} = I_{Q1} = I_{Q4}$ because R55 and R25A may be adjusted so that the current from source S3 is substantially equal to the current flowing into sink S1.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

We claim:

1. In an amplifying system, an amplifier having a first input terminal and a second input terminal and an output terminal;

a first amplifying device having a first control element for controlling current flow through said first device;

a second device serving as a current sink;

a third amplifying device having a control element for controlling current flow through said third device;

a fourth device serving as a current sink;

a fifth amplifying device having a pair of electrodes connected between terminals of said source; said fifth device having a control element for controlling current flow between said electrodes;

a source of current having two terminals;

an impedance;

a first series circuit including said first device, said impedance and said second device with a first junction point between said first device and one terminal of said impedance, and with a second junction point between said other terminal of said impedance and said second device;

signal input terminals including a first signal terminal and a second signal terminal;

said first input terminal being connected to said first signal terminal;

said second input terminal being connected to said first junction point;

said second signal terminal being connected to said second junction point;

a second series circuit including said third device and said fourth device; a first load resistor;

said first series circuit being connected in series with said first load resistor and said source terminals to receive current from said source;

a second load resistor;

said second series circuit being connected in series with said second load resistor and to said source terminals to receive current from said source;

said fifth device being connected to said source terminals to receive current from said source;

a sixth amplifying device having a pair of electrodes connected between terminals of such source; said sixth device having a control element for controlling the current flow between said electrodes of said sixth device;

said control element of said sixth device being connected to said amplifier output terminal;

one of said electrodes of said sixth device being connected to one of said source terminals and the other of said (output) electrodes being connected to the control element of each of the control elements of said first, third and fifth devices;

and positive feedback means in which said sixth device is connected in a positive feedback circuit which extends from said amplifier output terminal and through said sixth device, and said first device to said second input terminal in that order; an output terminal; and one of the electrodes of said fifth device being connected to said output terminal.

2. An amplifying system as set forth in claim 1 in which said first and third devices are transistors having matching characteristics.

3. An amplifying system as set forth in claim 1 in which said second and fourth devices are transistors having matching characteristics.

4. An amplifying system as set forth in claim 1 in which said first device is a transistor having an electrode; said first load resistance connects the last mentioned electrode to one of said source terminals; a zener diode; an additional resistance; one terminal of said zener diode being connected to the last mentioned source terminal; one terminal of said diode being connected to the last mentioned electrode; the other terminals of said zener diode and said diode being interconnected to one terminal of said additional resistance, the other terminal of said additional resistance being connected to the other source terminal.

5. An amplifying system as set forth in claim 1 including a first additional resistance; a zener diode; an additional transistor having a control element and a pair of electrodes; said additional resistance and said diode being connected in a series circuit between said source terminals with a point therebetween being connected to the last mentioned control element; a diode; one of the last mentioned electrodes being connected through the last mentioned diode to the control element of said sixth device; the other one of the last mentioned electrodes being connected to said first junction point.

6. In an amplifying system, an amplifier having a first input terminal and a second input terminal and an output terminal;

a first amplifying device having a first control element for controlling current flow through said first device;

a second amplifying device having a second control element for controlling current flow through said second device;

a third amplifying device having a third control element for controlling current flow through said third device;

a fourth amplifying device having a fourth control element for controlling current flow through said fourth device;

a fifth amplifying device having a fifth control element for controlling current flow through said fifth device;

a source of current having two terminals;

an impedance;

a first load resistor;

a first series circuit including said first load resistor, said first device, said impedance and said second device, in that order, with a first junction point between said first device and one terminal of said impedance, and with a second junction point between the other terminal of said impedance and said second device;

signal input terminals including a first signal terminal and a second signal terminal;

said first input terminal being connected to said first signal terminal;

said second input terminal being connected to said first junction point;

said second signal terminal being connected to said second junction point;

a second load resistor;

a second series circuit including said second load resistor, said third device and said fourth device;

said first series circuit being connected to said source terminals to receive current from said source;

said second series circuit being connected to said source terminals to receive current from said source;

said fifth device being connected to said source terminals to receive current from said source and having an output terminal;

a sixth amplifying device having a sixth control element and output electrodes for controlling the current flow between said output electrodes;

said sixth control element being connected to said amplifier output terminal;

one of said output electrodes of said sixth device being connected to one of said source terminals; and the other of said output electrodes of said sixth device being connected to the control element of each of said first, third and fifth control electrodes;

means providing a positive current feedback between said amplifier output terminal and said second amplifier input terminal with said sixth device and said first device being connected in a positive current feedback path which extends from said amplifier output terminal and through said sixth device, first device, impedance and second device, in that order;

the control elements of said second and fourth devices being interconnected with said second and fourth devices functioning as a current sink.

7. An amplifying system as set forth in claim 6 including additional means connected to said second input terminal and functioning as a current sink;

additional means connected to said output terminal of said fifth device and functioning as a current sink;

and additional means connected to said second junction point and establishing a normal operating voltage at such junction point.

8. In an amplifying system, an amplifier having a first input terminal and a second input terminal and an output terminal; first amplifying means; said first amplifying means including a first amplifying device having a first control element for controlling current flow through said first device;

means including a second device functioning as a first current sink;

a source of current having two terminals;

an impedance;

a first series circuit including said first device, said impedance and said second device, in that order, with a first junction point between said first device and one terminal of said impedance, and with a second junction point between the other terminal of said impedance and said second device;

signal input terminals including a first signal terminal and a second signal terminal;

said first input terminal being connected to said first signal terminal;

said second input terminal being connected to said first junction point;

said second signal terminal being connected to said second junction point;

said first series circuit being connected to said source terminals to receive current from said source;

second amplifying means; said second amplifying means including a third device having a control element and output electrodes for controlling the current flow between said output electrodes of said third device;

means including a fourth device functioning as a second current sink;

a second series circuit including said third device and said fourth device in that order; said second series circuit being connected to said source terminals to receive current from said source;

third amplifying means; said third amplifying means including a fifth device having a control element for controlling the current flow between a pair of electrodes of said fifth device;

means interconnecting said electrodes of said fifth device to said source terminals for the flow of current through said fifth device;

the control element of said fifth device being connected to the output terminal of said amplifier;

the control element of each of said first and third devices being connected to one of the electrodes of said fifth device; positive feedback means extending from said amplifier output terminal to said second amplifier input terminal including a path which extends from the amplifier output terminal, through said fifth and first devices to said second amplifier input terminal; and output means connected to said one electrode of said fifth device.

9. An amplifying system as set forth in claim 8 in which said output means includes an output terminal; additional means connected to said second input terminal and functioning as a current sink;

additional means connected to said output terminal of said output means and functioning as a current sink;

and additional means connected to said second junction point and supplying a current thereto to establish a normal operating voltage at such junction point.

10. An amplifying system as set forth in claim 8 in which said first and third devices are transistors having matching characteristics.

11. An amplifying system as set forth in claim 8 in which said second and fourth devices are transistors having matching characteristics.

* * * * *